Patented Feb. 28, 1933

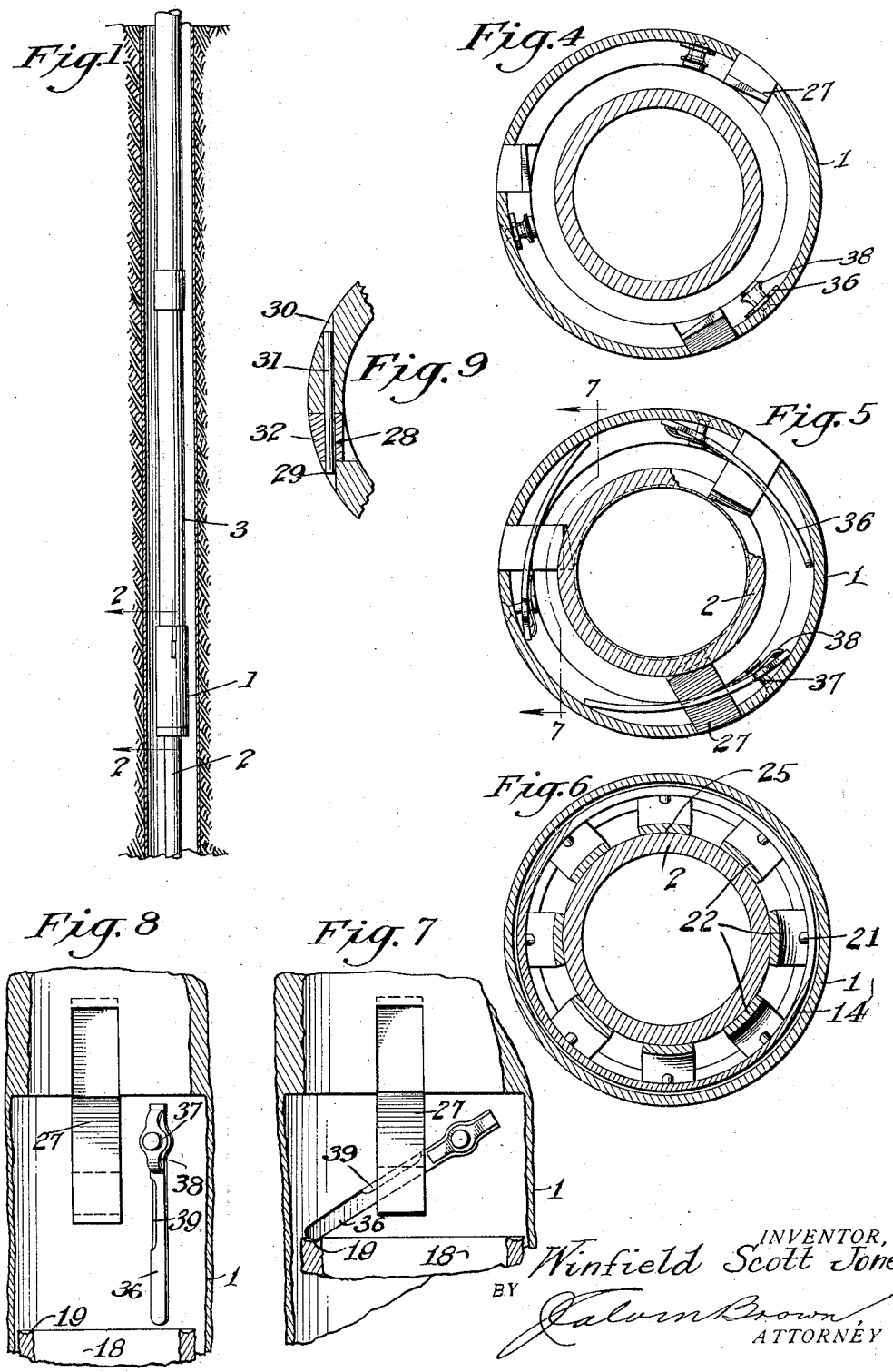

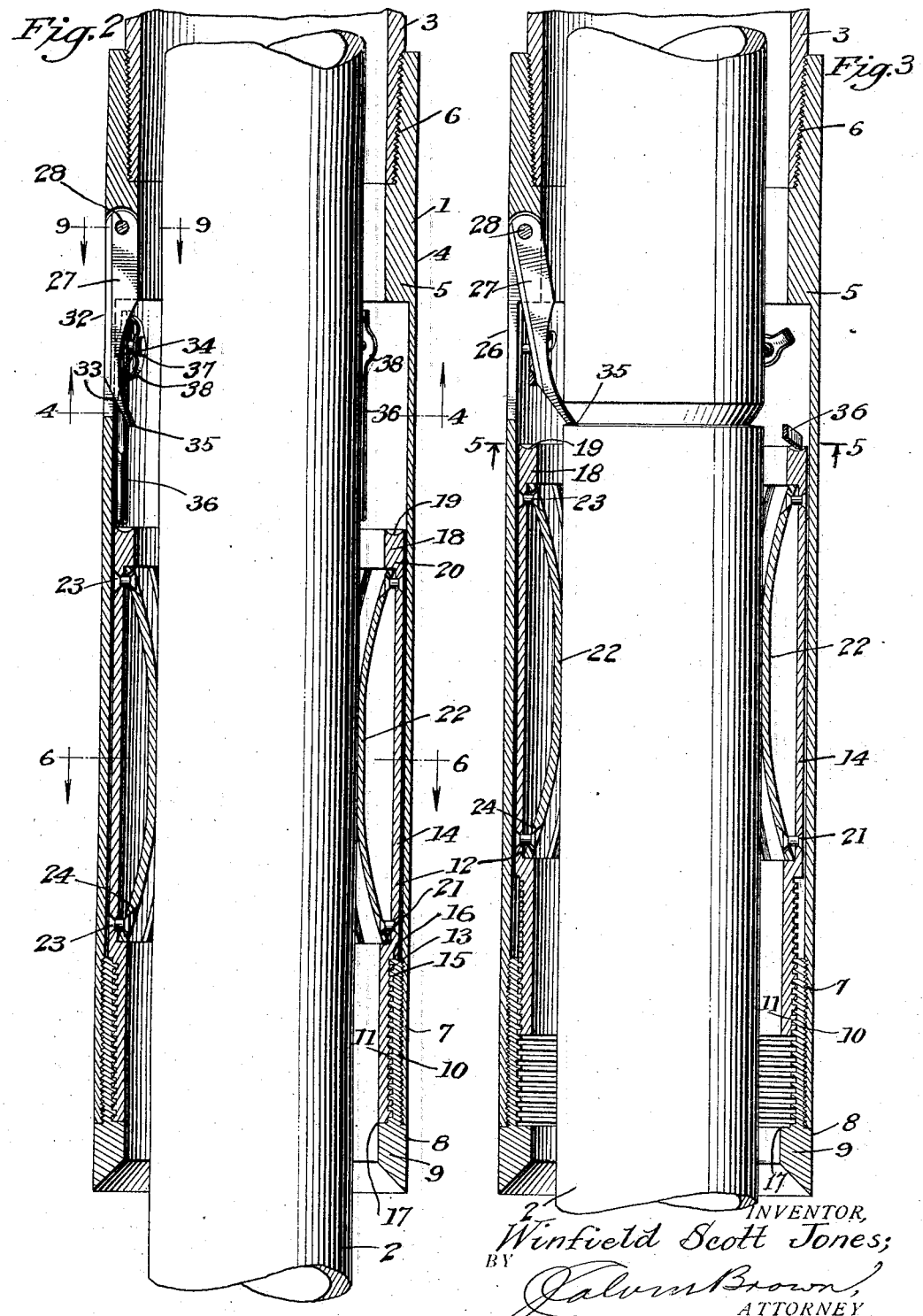

1,899,390

UNITED STATES PATENT OFFICE

WINFIELD SCOTT JONES, OF LONG BEACH, CALIFORNIA, ASSIGNOR OF THREE-EIGHTHS TO ELMORE D. JONES AND ONE-FOURTH TO CHARLES E. MUNN, BOTH OF LONG BEACH, CALIFORNIA

PIPE CUTTER

Application filed June 3, 1931. Serial No. 541,801.

This invention relates to oil tools, and particularly to a tool of the type known as an outside cutter.

Cutters are utilized in oil field practice for the purpose of severing pipe within a well hole. Often pipe becomes frozen due to various causes and where it becomes necessary to remove part of the tubing and it is impossible to dislodge it, cutters are often brought into use. The cutter will sever the tubing at the zone desired, whereupon lengths or stands of the tubing may be removed from the well hole.

The present invention contemplates a cutter of inexpensive design, having few operating parts and practically no element liable to be subjected to damage or breakage.

In its simplest embodiment, the invention provides one or more cutter blades swingingly suspended from the cutter body. Within the cutter body is a friction sleeve having one or more elements for frictionally engaging the "fish". This friction sleeve and cutter body are both screw-threaded at one end to a guide shoe and in such a manner that the friction body may be rotated to in turn rotate the guide shoe and cause relative movement between the guide shoe and friction sleeve, as well as relative movement of the cutter body. Cutter blade actuating means carried by the cutter body is adapted to be brought into contact with a portion of the friction sleeve in a manner adapted to force the cutter blade or blades into "fish" engagement so that rotation of the cutter body will cause the blades to cut the "fish".

A novel feature of the present invention resides in the blade actuating means. This blade actuating means includes an arm which may be slightly resilient and which arm, through the medium of a compression spring or the like, is adapted to be held against ordinary movement to the end that said arm does not float. The cutter blade is so shaped that the arm when moved will engage back of the cutter blade and cam the cutter blade into "fish" engagement.

From the brief description just given, it will be seen that few elements are utilized in the practice of this invention, and accordingly one of the objects of the invention is to reduce the number of operating parts, to the end that a cutter may be manufactured and sold at a reasonable price.

The invention contemplates among its further objects a cutter which is fool-proof in operation, performs the work required of it quickly, is easily released from work after a cutting operation, and which is generally superior to cutters now known to the inventor.

With the above and other objects in view, the invention consists in the novel and useful provision, formation, construction, association, and relative arrangement of parts, members and features, all as shown in a certain embodiment in the accompanying drawings, described generally, and more particularly pointed out in the claims.

In the drawings:

Figure 1 is a fragmentary elevation of the improved cutter attached to tubing and placed in a well hole, Figure 2 is an enlarged fragmentary sectional view on the line 2—2 of Figure 1, Figure 3 is a view similar to Figure 2, parts being in changed relation, Figure 4 is a cross sectional view on the line 4—4 of Figure 2, Figure 5 is a cross sectional view on the line 5—5 of Figure 3, Figure 6 is a sectional view on the line 6—6 of Figure 2, Figure 7 is a fragmentary sectional view on the line 7—7 of Figure 5, Figure 8 is a view similar to Figure 7, the cutter and its actuating member being in changed relation, and, Figure 9 is a fragmentary sectional view on the line 9—9 of Figure 2.

Referring to the drawings, the improved pipe cutter is shown at 1 in Figure 1, and supposedly in a position where it is to cut or sever pipe, such as shown at 2. The pipe to be cut is ordinarily called the "fish". The pipe cutter itself is carried by pipe 3 which is lowered from the surface of the well and likewise adapted to be rotated through suitable mechanism at the well surface in order that the pipe cutter may perform a cutting operation upon the "fish".

Referring to Figure 2, the improved cutter includes a cutter body 4 cylindrical in form. The said cutter body is enlarged from a thickness standpoint for a zone inward from one end thereof, as shown at 5, and likewise provided with a box 6. As is customary, the said box contemplates a slightly tapered bore, the walls of which are screw-threaded for engagement with threads on the pipe 3. The opposite end of the cutter body is likewise screw-threaded, as shown at 7, for threaded engagement with a shoe 8. This shoe is enlarged at 9 while the remaining annular portion 10 is reduced as to thickness so as to present a flush surface between the periphery of the shoe and the cutter body when the two are joined together. The inner surface of the part 10 is provided with square type threads 11. A sleeve 12 has an offset portion 13 with respect to a portion 14 and the offset portion is provided with square type threads 15 for engagement with the threads 11. This offset portion provides a shoulder 16 and due to the reduced width of the part 10 relative to the part 9, a shoulder is provided at 17. Thus, when the sleeve is in the position shown in Figure 2, one end thereof will abut against the shoulder 17 and the upper end of the part 10 will abut against the shoulder 16 of the sleeve. The opposite end of the sleeve is enlarged at 18 and provided at its end with an annular concave groove 19. It will be seen that a shoulder is provided at 20 between said enlargement 18 and the body 14 of the sleeve. Between the shoulder 20 and a shoulder 21 formed by providing the offset in the said sleeve, I place one or more bowed leaf springs 22. In the present instance, a plurality of said springs are provided, as best illustrated in Figure 6, and said springs are held in position at both ends to the sleeve by the tie pins 23. The leaf springs are provided with enlarged transverse openings 24 with which a head or each pin engages and in such a manner as to permit relatively free movement of the leaf springs when engaging the "fish". Furthermore, the work engaging faces or surfaces of the leaf springs may be transversely curved in the manner shown at 25, so as to secure a better grip upon the work which, in this instance, is the "fish".

The enlarged portion 5 of the cutter body as well as a portion of the body itself is longitudinally and transversely slotted at 26. One or more of said slots 26 may be provided and, in the present instance, three equidistantly spaced slots are shown in Figures 4 and 5. A cutter blade 27 is swingingly fitted within a slot 26. The cutter blade includes an elongated member, one portion of which is transversely bored at 28 (see Figure 9) and through which bore and bores contained in the body, as shown at 29 and 30, a pin 31 is passed for the purpose of anchoring or holding the blade to the body. The outer surface of the blade is curved at 32 so as to conform to the general curvature of the periphery of the cutter body. The cutter blade is longer than the length of the slot in the body and the said blade has its nose or tip portion inclined or at an angle to what may be termed the back of the blade, as shown at 33, the back being the portion designated as 32. Furthermore, the inner edge portion of the blade is given a gradual curve at 34. The cutting edge of the blade is, of course, at its blade point 35 and likewise along the curved portion 34.

The cutter actuating means includes an elongated blade or arm 36 which is adapted to be carried on a pin 37, said pin in turn being secured to the inner wall surface of the cutter body. This pin has the head thereof spaced from a surface of the blade 36 and included between the head and the blade is a leaf spring 38. This leaf spring has end portions adapted to bear against the blade 36 to hold the same against the inner surface of the cutter body and normally against swinging movement. In other words, the said blade does not float.

There would be one actuating means for each blade provided in the cutter and as, in the present instance, there are three of said blades, there would be three of said actuating means. The blade actuating means are slightly spaced from the cutter blades to be actuated. The arm of said blade actuating means is tapered at 39.

The operation, uses and advantages of the invention just described are as follows:

It will be noted that each blade is adapted for swinging movement inwardly of the cutter body. The inclined portion of the nose will abut against the wall bounding the lowermost portion of the slot, and thus limit outward swinging movement of the blade. If we assume that the cutter has been lowered within a well hole through the medium of tubing 3 and in such a manner as to surround the tubing 2 which constitutes the "fish", it will be observed, as shown in Figure 2, that the leaf springs of the sleeve will engage the periphery of the "fish". Having reached the zone that it is desired to sever the "fish", the tubing 3 is then rotated, in the present instance clockwise, and which clockwise movement will start an unthreading between the sleeve 12 and the guide 8. Either the tubing may be lowered as the unthreading occurs, or the tubing 3 may be simply rotated, in which instance the sleeve 12 would gradually raise within the cutter body, until the lowermost end or ends of each blade or arm 36 of the cutter actuating means engages the groove 19 on the upper end of the sleeve. When this occurs, further upward movement of the sleeve will cause the arms to swing from the substantially vertical position shown in Figure 2 to various angles of inclination to vertical as, for instance, shown in Figure 3. It will be noted that this will occur, due to the fact that the cutter body is being rotated and rotation will, of course, carry the cutter actuating means therewith so that the said cutter actuating means will assume a position as shown in Figure 3. It will be observed that each blade of this cutter actuating means is beveled at 39 and will engage the inclined portion of the nose of each cutter blade. This engagement, as the cutter actuating means gradually assumes greater and greater inclination, will force each cutter blade into cutting engagement with the "fish" in the manner illustrated in both Figures 3 and 5. It will thus be seen that a progressive cut of the "fish" occurs due to the fact that as the cutter body is rotated, the friction sleeve is gradually fed upwardly within the said body, or to adopt an opposite notation, the sleeve remains substantially stationary, the body rotating and moving downwardly, the result of course being the same, and the cutter blade is progressively moved inwardly and progressively cuts the "fish". An operator at the surface of the well can, of course, tell when the "fish" is completely cut through, particularly if any pull is placed upon the "fish" at the surface of the well. It will be observed that the cutter actuating means are partially flexible so as to bend readily, as shown in Figure 5, during rotation of the cutter body. After a cutting operation has been completed, it is a simple matter to reverse turning movement of the cutter body which, of course, will cause the sleeve to be re-threaded to the shoe or guide 8. Of course, pressure exerted against the blade will tend to push the blade outwardly from the cut "fish" and this movement is communicated to the blade actuating mechanism to in turn cam the blade actuating mechanism back to its original position, as shown in Figure 2. It will be seen in Figure 5 that the blade actuating mechanism while bowed slightly has moved out against the compression exerted thereagainst by the spring or springs 38. In order that the cutter actuating means should not be damaged, it is essential that the pin which secures the same should not have the head thereof extend inwardly of the cutter body a distance greater than the transverse width of the part 5 or, for that matter, of the portion 18 of the sleeve, as is self-evident.

In order to assure that no swinging movement occurs, so far as the cutter blades are concerned, during a lowering of the cutter, I may place a little waste or a frangible member in each slot 26 in such a manner as to bear against a portion of each cutter and normally hold each cutter against movement.

It is obvious that various changes and modifications and variations may be made in practicing the invention in departure from the particular showing of the drawings without, however, departing from the true spirit of the invention.

I claim:

1. A cutter, having in combination: a body, a cutter blade swingingly carried by the body, a swing arm secured to the body adjacent the cutter blade, and a sleeve within the body provided with a spring for frictionally engaging the work to be cut, said sleeve and said body being so related that rotation of the body in one direction causes telescopic movement of the sleeve within the body to bring the sleeve into contact with said arm and force the arm into blade engagement.

2. A cutter, having in combination: a body, a guide for one end of said body, a sleeve within said body and threaded to said guide, a spring carried by the sleeve for frictional engagement with work to be cut, a swing cutter blade carried by the body, and a swing arm adjacent said cutter blade and fastened to said body, rotation of said body causing an un-screwing of said sleeve from the guide when the said spring is in frictional engagement with work to move said sleeve into engagement with said arm, said arm in turn contacting with said cutter blade to force the same into work engagement.

3. A cutter, having in combination: a body, and a cutter blade swingingly carried thereby, cutter actuating means comprising a swing arm pinned to said body adjacent the cutter blade, means for operating the cutter actuating means, said swing arm being adapted to contact with a side of said cutter upon actuation of said last means to force the cutter inwardly of the body when said arm assumes an inclination relative to the axis of said body.

4. A cutter, having in combination: a cutter body, formed with a slot, a cutter blade in part confined within said slot, said cutter blade having a nose portion provided with an inclined part, and cutter actuating means comprising an arm swingingly mounted to said body at a zone adjacent the cutter blade, means for operating the cutter actuating means, said cutter blade being adapted for movement to contact with the inclined part of the nose of said blade to move the said blade inwardly of the body.

5. A cutter, having in combination: a substantially annular cutter body formed with a transverse slot, a cutter blade swingingly mounted in said slot to said body; said cutter blade having an inclined nose portion, cutter actuating means comprising an elongated arm swingingly mounted to said body and within the same; and means adapted to move longitudinally of said body when the said body is rotated, to cause said arm to engage the inclined part of the cutter blade and move the same inwardly of the said body.

In testimony whereof, I have signed my name to this specification at Signal Hill, California, this 22nd day of May, 1931.

WINFIELD SCOTT JONES.